United States Patent Office 3,255,274
Patented June 7, 1966

3,255,274
RUBBER TACKIFIERS COMPRISING THE REACTION PRODUCT OF (1) A POLYMETHYLENE POLYPHENOL, (2) A PHENOL NON-REACTIVE AT ITS PARA POSITION AND (3) AN ALDEHYDE
Peter A. Yurcick, South River, and Donald T. Day, Matawan, N.J., assignors to Catalin Corporation of America, a corporation of Delaware
No Drawing. Filed Apr. 30, 1963, Ser. No. 276,999
20 Claims. (Cl. 260—845)

This invention relates to tackifiers for vulcanizable synthetic rubbers such as styrene-butadiene rubber, ethylene-propylene rubber, cis-polybutadiene rubber and the like. More particularly, the invention relates to tackifiers comprised of certain polymethylene polyphenol-phenol-aldehyde condensation products, to a method of preparing such products, and to vulcanizable synthetic rubber compositions which are tackified with such products.

It is known that synthetic rubbers such as styrene-butadiene rubber, ethylene-propylene rubber, cis-polybutadiene rubber, polyisoprene rubber, butyl rubber and similar low saturation rubbers are deficient in the degree of tackiness which is necessary for working the rubbers into shaped, vulcanized masses. Therefore, tackiness is usually imparted to these rubbers by addition of a separate material which conventionally may be rosin, rosin esters, polyterpene resins, liquid nitrile elastomers, phenolic and other hydrocarbon resins. The disadvantage to addition of a separate tackifier is that the tackifier often has an adverse effect upon other desired physical properties of the rubber, for example, retardation of cure rate, or reduction of tensile strength, elasticity or resistance to heat and chemical attack.

The present invention provides a new class of tackifiers for synthetic rubbers which have been found to impart excellent tackiness to synthetic rubbers with a minimum decrease in other physical properties. The novel tackifiers of the invention comprise the heat-condensed products of reaction between a polymethylene polyphenol, a phenol which is non-reactive to aldehyde at its para position and an aldehyde, in the presence of an acid catalyst. Such products are believed to have a structure similar to linear, straight-chain type polymeric material since use of the para non-reactive phenols does not permit the products to undergo any significant three-dimensional cross-linking during the condensation reaction. That the above-described condensation products are excellent tackifiers for synthetic rubbers is quite surprising and unexpected since the polymethylene polyphenols employed are derived from waxy hydrocarbon molecules which would ordinarily be expected to give the converse of adhesiveness or tack. Nevertheless, the effectiveness of this new class of tackifier has been demonstrated and confirmed in several synthetic rubber formulations having important commercial applications, as will be described herein below.

As has been summarized above, the novel tackifiers of the invention comprise the reaction product of a polymethylene polyphenol, a phenol which is non-reactive to aldehyde at its para position and an aldehyde. The term polymethylene polyphenol refers to a type of material which is known in the art as a wax or waxy phenol and which constitutes a mixture of long-chain hydrocarbons, like those of paraffin wax, having phenolic nuclei spaced along the length of the chains. These polymethylene polyphenols are prepared by chlorinating a mixture of long-chain hydrocarbons having from about 12 to 30 carbon atoms until from 15% to 45% chlorine content based on the weight of the chlorinated hydrocarbons is attained, and then alkylating a phenol with the chlorinated hydrocarbons in the presence of a Friedel-Crafts catalyst at elevated temperatures. In this way, phenolic nuclei are substituted for the chlorine atoms on the hydrocarbon chains and these phenolic nuclei are spaced apart from each other by relatively long methylene chains derived from the long-chain hydrocarbons; hence, the term polymethylene polyphenol.

In addition to phenol itself, alkyl, alkoxy and halogen substituted phenols may be alkylated with the chlorinated long-chain hydrocarbons to yield polymethylene polyphenols of the type described above. For the purpose of this invention, useful polymethylene polyphenols are those which have been prepared by heat reacting in the presence of a Friedel-Crafts catalyst a mixture of chlorinated hydrocarbons, containing about 12 to about 30 carbon atoms per molecule and about 15% to about 45% chlorine by weight of the chlorinated hydrocarbons, with phenol, or an alkyl, alkoxy or halogen substituted phenol, in such proportions that the ratio of chlorine atoms to each mol of phenol in the reaction mixture is from about 0.1:1 to about 2:1. By controlling the proportions within the stated ratio limits, the degree of alkylation of phenolic nuclei in the polymethylene polyphenol is also controlled so that reactive ortho and para positions on the phenolic nuclei will still be available for reaction with an aldehyde and a phenol as is necessary in order to form the heat-condensed rubber tackifiers of the invention. Further details of preparing the above-specified polymethylene polyphenols in one preferred manner are described in U.S. Patent 2,800,512 to Hathaway. It will be understood that other equivalent methods of preparing the polymethylene polyphenol may also be employed as, for example, alkylation reaction between di-alphi olefins of suitable long-chain lengths and a phenol in the presence of boron trifluoride or sulfuric acid catalyst.

In accordance with the invention, the polymethylene polyphenol is reacted with an aldehyde and a phenol which is blocked so as to be non-reactive to aldehyde at its para position. The requirement that the selected phenol be non-reactive at its para position is critical and essential, if reaction products are to be obtained which are both compatible with and capable of imparting tackiness to synthetic rubber compositions.

The para position of the selected phenol may be rendered non-reactive by direct substitution or by steric hindrance. For example, phenols directly substituted at the para position with hydrocarbon radicals having from one to eighteen carbon atoms, such as p-cresol, p-ethyl phenol, p-isopropyl phenol, p-tert-butyl phenol, p-amyl phenol, p-octyl phenol, p-nonyl phenol, p-dodecyl phenol, p-cumyl phenol, p-phenyl phenol and p-cyclohexyl phenol may be employed. In addition, phenols substituted at one of the meta positions with a hydrocarbon radical having at least four carbon atoms in a structure other than a straight chain or phenols substituted at both meta positions with hydrocarbon radicals having at least three carbon atoms each may also be employed. Examples of such sterically hindered phenols are m-tert-butyl phenol, m-sec.-amyl phenol, m-iso-hexyl phenol, m-iso-octyl phenol, 3,5-diisopropyl phenol, 3,5-di-tert-butyl phenol, 3,5-diamyl phenol, 3,5-dioctyl phenol and 3,5-dinonyl phenol.

As previously noted, the polymethylene polyphenol and the para non-reactive phenol are condensed with an aldehyde in the presence of an acid catalyst. For this purpose, formaldehyde, its solutions and polymers, are preferred. However, other aldehydes such as acetaldehyde, butyraldehyde, isobutyraldehyde and furfuraldehyde may also be employed.

As for the acid catalyst, any strong mineral acid such as phosphoric, sulfuric or hydrochloric acids may be employed. Organic acids may also be used and these may, for example, be maleic, oxalic, para toluene sulfonic, chloroacetic or octyl phenol sulfonic acids. The requirement of an acid catalyst is critical. Alkali catalysts do not yield condensation products having any practical utility as tackifying agents for the synthetic rubbers.

As to proportions to be used in forming the tackifying agents of the invention, the number of moles of polymethylene polyphenol reacted with the para non-reactive phenol may vary considerably depending on the properties which are desired for a particular application. In general, the ratio of the number of moles of polymethylene polyphenol to the total number of moles combined of the polymethylene polyphenol and the para non-reactive phenol in the reaction mixture may vary from about 0.01:1 to 0.5:1. A higher proportion of polymethylene polyphenol does not significantly increase the tackiness imparted by the reaction product and is ordinarily wasteful, while a lower proportion of polymethylene polyphenol is insufficient to achieve useful tackiness in synthetic rubber compositions. Proportions intermediate the stated range yield reaction products capable of imparting correspondingly intermediate degrees of tackiness and may be selected as desired for any particular application.

As for the aldehyde to be condensed with the polymethylene polyphenol and the para non-reactive phenol, the ratio of the number of moles of aldehyde to the total number of moles combined of the polymethylene polyphenol and the para non-reactive phenol in the reaction mixture may vary from about 0.5:1 to 1.5:1. A preferred range for the ratio of moles of aldehyde to the moles combined of polymethylene polyphenol and para non-reactive phenol is from about 0.75:1 to 1:1 since these preferred proportions will yield reaction products which are satisfactory for use in the more important commercial synthetic rubber formulations. A catalytically effective amount of acid catalyst should be used in the reaction mixture and this generally may be within the range of 0.25% to 3.0% acid catalyst based on the combined weight of the polymethylene polyphenol and the para non-reactive phenol that is present in the reaction mixture.

The reaction mixture of polymethylene polyphenol, para non-reactive phenol, aldehyde and acid catalyst, where such ingredients are not mutually miscible or where otherwise desired, may be dissolved in any suitable solvent, for example, organic ketones, alcohols, esters or petroleum ether. The condensation reaction is carried out at elevated temperatures within the range from about 80° C. to about 125° C. and reaction will be completed in from about 1 to about 4 hours. Thereafter, the reaction product, either before or after neutralization, is stripped of solvent, neutralized with a base, preferably an amine, and finally dehydrated and cooled. The reaction products are usually resinous solids which melt at temperatures in excess of 55° C., although in some cases products which are heavy, viscous liquids at room temperatures may also be obtained. Neutralization of the reaction products is a preferred procedure as this will avoid any problems regarding an unfavorable effect from excessive acidity on the cure or vulcanization of the synthetic rubbers with which the reaction products are compounded.

The above-described tackifiers may be employed in any synthetic rubber composition the tackiness of which is desired to be improved, but the invention has particular advantage with those synthetic rubbers which are known to be seriously deficient in tackiness. These are the low saturation synthetic rubbers exemplified by isoolefin-containing rubbery polymers such as polyisobutylene, butyl rubber, halogenated butyl rubber and ethylene-propylene terpolymer. In addition, the tackiness of cis-polybutadiene, styrene-butadiene rubber, styrene-butadiene-acrylonitrile rubber and other synthetic elastomers is materially improved by the tackifiers of the present invention.

For convenience of reference and brevity, all of the above-mentioned rubbers will be hereinafter identified generally as a vulcanizable synthetic rubbery polymer.

The tackifiers of the invention may be added to the vulcanizable synthetic rubbery polymer in amounts within the range from about 2% to about 60% of the weight of the rubbery polymer. The specific proportion to be used is for the most part determined by the end use of the vulcanizable synthetic rubbery polymer. Where the rubbery polymer is to be used as a pressure sensitive adhesive, for example, a high proportion of tackifier for a high degree of tackiness will obviously be required, whereas in automobile tire applications a lower proportion of tackifier for a lower degree of tackiness will be suitable. Other conventional ingredients such as fillers, curing agents, accelerators, activators, plasticizers, extenders and pigments may, of course, be worked into the combination of vulcanizable synthetic rubbery polymer and tackifiers prepared in accordance with the invention. The compounding of all ingredients may be carried out in conventional manner such as on a mill, in a Banbury mixer, or in solution.

The following specific embodiments of the invention will illustrate further details thereof.

Example 1

In this example, a commercially available polymethylene polyphenol sold under the trademark Flexiphen 160 by Koppers Company, Inc., and having an average molecular weight of 350 (1 mol phenol equivalent) was employed to form a tackifying agent for vulcanizable synthetic rubbery polymers. 795 grams (2.28 moles) of the Flexiphen 160, 3,980 grams (19.3 moles) of p-octyl phenol, and 1,100 grams (16.2 moles) of 44.2% aqueous formaldehyde solution were mixed with 26.2 grams of octyl phenol sulfonic acid dissolved in 11.2 grams of naphtha solvent. The ratio of moles Flexiphen 160 to total moles combined of Flexiphen 160 and p-octyl phenol, and the ratio of moles formaldehyde to total moles combined of Flexiphen 160 and p-octyl phenol, in the reaction mixture were 0.11:1 and 0.75:1 respectively. The catalyst weight was 0.55% based on the combined weight of Flexiphen 160 and p-octyl phenol.

The mixture was heated to atmospheric reflux with agitation to initiate a condensation reaction therein which was continued for 2½ hours. The condensation product was then distilled under reduced vacuum (10 inches) until its temperature rose to 110° C. The vacuum was increased to 28 inches, and at a resin temperature of 130° C., 19.1 grams of triethanolamine was added. Vacuum dehydration was continued to a final resin temperature of 140° C. at 28 inches of vacuum and then the resinous condensation product was poured into metal trays to cool. A yield of 5,050 grams was realized and the final product had the following physical properties:

Nagel melting point, ° C. _____ 77
Specific gravity _____ 1.009
Acid number _____ 35.7

Example 2

1,085 grams (3.1 moles) of the Flexiphen 160 described in Example 1, 2,710 grams (13.2 moles) of p-octyl phenol, and 795 grams (11.7 moles) of 44.2% aqueous formaldehyde solution were mixed with 20.1 grams of octyl phenol sulfonic acid dissolved in 10.3 grams of naphtha solvent. The ratio of moles Flexiphen 160 to total moles combined of Flexiphen 160 and p-octyl phenol, and the ratio of moles formaldehyde to total moles combined of Flexiphen 160 and p-octyl phenol, in the reaction mixture were 0.19:1 and 0.71:1 respectively. The weight of catalyst was 0.53% of the combined weight of Flexiphen 160 and p-octyl phenol.

The mixture was reacted under atmospheric reflux with agitation for 2 hours and then dehydrated and neutralized in the manner described in Example 1. The final reaction product had the following physical properties:

Nagel melting point, ° C. _____ 72
Specific gravity _____ 1.010
Acid number _____ 34.8

Example 3

In this example the tackiness imparted by the reaction product of Example 1 to an ethylene-propylene rubbery terpolymer formulation, suitable for rubberizing woven fabrics, was evaluated. The ethylene-propylene terpolymer used is sold commercially under the trade name Royalene 200 by U.S. Rubber Company. Royalene 200 is a terpolymer of ethylene, propylene and a diene, having a Mooney viscosity (ML–4) at 212° F. of 140, a specific gravity of 0.865 and iodine No. of 10, and is vulcanizable by conventional sulfur accelerator systems. The following formulation was made:

Ingredients:   Parts by weight
    Royalene 200 _____ 100
    Reaction product, Example 1 _____ 10
    HAF black (carbon black) _____ 50
    Sundex 53* (aromatic processing oil) _____ 80
    Zinc oxide (activator) _____ 5
    Sulfur (curing agent) _____ 2
    Tetramethylthiuram monosulfide (accelerator)_ 1.5
    Mercaptobenzothiazole (accelerator) _____ 0.5

* Sundex 53 is a hydrocarbon oil having a specific gravity at 60° F. of 0.9834, an SUS viscosity at 100° F. of 2690, and a flash point of 405° F.

A similar formulation was prepared in which the 10 parts of the Example 1 reaction product were replaced by 10 parts of a conventional resinous alkyl phenol-formaldehyde, oil soluble, non-heat reactive type tackifying agent.

Both formulations were satisfactorily vulcanized at a temperature above 300° F. Prior to vulcanization, the formulation containing the Example 1 reaction product exhibited materially greater tackiness than the one prepared with the conventional tackifying agent.

Example 4

Example 3 was repeated except that the 10 parts of the Example 1 reaction product were replaced by 10 parts of the reaction product formed in Example 2. The results were substantially the same as noted in Example 3.

Example 5

A synthetic rubber formulation similar to the one described in Example 3 was prepared except that the 100 parts of the Royalene 200 ethylene-propylene terpolymer were replaced by an equal amount of another ethylene-propylene rubbery terpolymer available commercially under the trade name ECD–330. The ECD–330 terpolymer had a Mooney viscosity (ML–4) at 212° F. of 85, a specific gravity of 0.85 and was vulcanizable with conventional sulfur accelerator curing systems. Using the ECD–330 rubbery terpolymer in the formulation of Example 3, it was again noted that the tackiness imparted by the Example 1 reaction product was materially greater than that of the conventional tackifying agent.

Example 6

Example 5, using the ECD–330 ethylene-propylene rubbery terpolymer, was repeated except that the 10 parts of the Example 1 reaction product were replaced by an equal amount of the reaction product formed in Example 2. The results were the same as those noted in Example 5.

Example 7

In this example the tackifying capability of the reaction product of Example 1 in a butyl rubber formulation was evaluated. The butyl rubber employed is available commercially under the trade name Butyl 325 and has a specific gravity of 0.92 and a Mooney viscosity (ML–8) at 212° F. of 41–49. The Example 1 reaction product was incorporated in the following formulation:

Ingredients:   Parts by weight
    Butyl rubber (Butyl 325) _____ 100
    Reaction product, Example 1 _____ 10
    HAF black (carbon black) _____ 15
    Bayol F * (processing oil) _____ 7.5
    Zinc oxide (activator) _____ 5
    Sulfur (curing agent) _____ 2
    Tellurium diethyldithiocarbamate (accelerator) 1
    N,4-dinitroso-N-methyl aniline (promoter) ___ 0.8

* Bayol F is a paraffinic hydrocarbon oil having a specific gravity of 0.825, a flash point of 290° F. and a SSU viscosity at 100° F. of 50 seconds.

A similar formulation was prepared using the conventional tackifying agent described in Example 3 in place of the 10 parts of the Example 1 reaction product, and both recipes were satisfactorily vulcanized at a temperature above 360° F. Prior to vulcanization, the formulation having the Example 1 reaction product had superior tack as compared to the formulation prepared with the conventional tackifying agent.

Example 8

Example 7 was repeated except that the 10 parts of the Example 1 reaction product were replaced by 10 parts of the reaction product formed in Example 2. It was again noted that the formulation containing the Example 2 reaction product was superior in tackiness to the one formed with the conventional tackifying agent.

Example 9

In this example, the tackifying capability of the Example 1 reaction product was evaluated in a liquid rubber splicing cement suitable for laminating automotive tire treads to the carcass of the tire. The rubber used in the recipe was synthetic styrene-butadiene rubbery copolymer, of tread stock grade, along with a minor proportion of smoke-cured natural rubber sheet. The following specific formulation was prepared:

Ingredients:   Parts by weight
    Styrene-butadiene tread stock _____ 170
    Smoke-cured natural rubber _____ 20
    Reaction product, Example 1 _____ 15
    n-Hexane (solvent) _____ 1400

A similar formulation was prepared using the conventional tackifying agent described in Example 3 in place of the 15 parts of the Example 1 reaction product.

The recipe containing the Example 1 reaction product had superior characteristics of adhesiveness and tack as compared to the recipe made with the conventional tackifying agent.

Example 9A

Example 9 was repeated except that the 15 parts of the Example 1 reaction product were replaced by 15 parts of the reaction product formed in Example 2. It was again noted that the tack characteristics of the formulation containing the Example 2 reaction product were superior to those given by the formulation made with the conventional tackifying agent.

Example 10

1680 g. of dry phenol are charged to a vessel, heated to 60° C. and then 76 g. (4.5% based on phenol weight) of $AlCl_3$ are added and the temperature of the mixture raised to 160° C. 3800 g. of a mixture of long-chain hydrocarbons having from twenty to twenty-five carbon atoms and containing 25% chlorine by weight are slowly added to the phenol-$AlCl_3$ mixture, the temperature being controlled at 160° C. to 165° C. and the ratio of chlorine atoms to moles of phenol being 1.5:1. The evolved HCl is absorbed in a caustic solution and the reaction is continued for 2 additional hours after all of the hydrocarbon mixture has been added to insure completion of the reaction. After extraction of the catalyst, a polymethylene polyphenol is obtained having an average molecular weight (1 ArOH equivalent) of about 250.

0.05 mole of this polymethylene polyphenol, 4.95 moles of p-isopropyl phenol and 5 moles of formaldehyde are mixed with 2.5% sulfuric acid based on the combined weight of the polymethylene polyphenol and the p-isopropyl phenol. The ratio of moles polymethylene polyphenol to moles combined of polymethylene polyphenol and p-isopropyl phenol, and the ratio of moles formaldehyde to moles combined of polymethylene polyphenol and p-isopropyl phenol, in the reaction mixture are 0.01:1 and 1:1 respectively. The mixture is condensed at elevated temperature in the manner described in Example 1 for about 2 hours. The reaction product is dehydrated, neutralized, as in Example 1, and recovered as a resinous solid.

*Example 11*

1130 g. of dry o-cresol are charged to a vessel, mixed with 61 g. of anhydrous AlCl$_3$ and heated in the manner described in Example 10. 2175 g. of a mixture of long-chain hydrocarbons having from 12 to 16 carbon atoms and containing 30% chlorine by weight are added to the o-cresol-AlCl$_3$ mixture at the controlled temperature, the ratio of chlorine atoms to moles of phenol being 1.75:1. After completion of the reaction as described in Example 10, a polymethylene polyphenol is obtained having an average molecular weight (1 ArOH equivalent) of about 250.

1.8 moles of this polymethylene polyphenol, 1.8 moles of 3,5- diisopropyl phenol and 2.7 moles of formaldehyde are mixed with 3.0% phosphoric acid based on the combined weight of the polymethylene polyphenol and the 3,5-diisopropyl phenol. The ratio of moles polymethylene polyphenol to moles combined of polymethylene polyphenol and 3,5-diisopropyl, and the ratio of moles formaldehyde to moles combined of polymethylene polyphenol and 3,5-diisopropyl phenol, in the reaction mixture are 0.5:1 and 0.75:1 respectively. The mixture is condensed at atmospheric reflux temperatures as described in Example 1 for about 3½ hours. The reaction product is dehydrated, neutralized as in Example 1 and recovered as a resinous solid.

*Example 12*

6250 g. of dry o-methoxy phenol are charged to a vessel, mixed with 290 g. of anhydrous AlCl$_3$ and heated in the manner described in Example 10. 6700 g. of a mixture of long-chain hydrocarbons having from 18 to 20 carbon atoms and containing 40% chlorine by weight are slowly added at controlled temperature as described in Example 10, the ratio of chlorine atoms to moles of o-methoxy phenol being 1.5:1. After completion of the reaction as described in Example 10, a polymethylene polyphenol is obtained having an average molecular weight (1 ArOH equivalent) of about 200.

1.5 moles of this polymethylene polyphenol, 13.5 moles of p-dodecyl phenol and 7.5 moles of formaldehyde are mixed with 2.0% hydrochloric acid based on the combined weight of the polymethylene polyphenol and the p-dodecyl phenol. The ratio of moles polymethylene polyphenol to moles combined of polymethylene polyphenol and p-dodecyl phenol, and the ratio of moles formaldehyde to moles combined of polymethylene polyphenol and p-dodecyl phenol, in the reaction mixture are 0.1:1 and 0.5:1 respectively. The mixture is condensed at atmospheric reflux temperature for about 3 hours and then dehydrated and neutralized in the manner described in Example 1 and a viscous liquid reaction product is obtained.

*Example 13*

1250 g. of dry o-butyl phenol are charged to a vessel, mixed with 70 g. of anhydrous AlCl$_3$ and heated in the manner described in Example 10. 3270 g. of a mixture of long-chain hydrocarbons having 18 to 20 carbon atoms and containing 18% chlorine by weight are slowly added at controlled temperature, the ratio of chlorine atoms to moles of o-butyl phenol being 2:1. Upon completion of the reaction as described in Example 10, a polymethylene polyphenol is obtained having an average molecular weight ( 1 ArOH equivalent) of 470.

2.5 moles of this polymethylene polyphenol, 4.7 moles of m-isohexyl phenol and 10 moles of formaldehyde are mixed with 3.0% maleic acid based on the combined weight of the polymethylene polyphenol and the m-isohexyl phenol. The ratio of moles polymethylene polyphenol to moles combined of polymethylene polyphenol and m-isohexyl phenol, and the ratio of moles formaldehyde to moles combined of polymethylene polyphenol and m-isohexyl phenol, in the reaction mixture are 0.35:1 and 1.4:1 respectively. The reaction mixture is condensed for about 2½ hours at atmospheric reflux temperature and then dehydrated and neutralized in the manner described in Example 1. The reaction product recovered is a resinous solid.

*Example 14*

1390 g. of dry phenol are charged to a vessel, mixed with 65 g. of anhydrous AlCl$_3$ and heated as described in Example 10. 5270 g. of a long-chain hydrocarbon having predominantly 30 carbon atoms per molecule and containing 20% chlorine by weight are slowly added at controlled temperature, the ratio of chlorine atoms to moles of phenol being 2:1. Upon completion of the reaction as described in Example 10, a polymethylene polyphenol is obtained having an average molecular weight (1 ArOH equivalent) of 380.

1 mol of this polymethylene polyphenol, 1.5 moles of p-cresol and 2.5 moles of formaldehyde are mixed with 3.0% oxalic acid based on the combined weight of polymethylene polyphenol and p-cresol. The ratio of polymethylene polyphenol to moles combined of polymethylene polyphenol and p-cresol, and the ratio of moles formaldehyde to moles combined of polymethylene polyphenol and p-cresol, in the reaction mixture are 0.4:1 and 1:1 respectively. The reaction mixture is condensed for about 3 hours at atmospheric reflux temperature and then dehydrated in the manner described in Example 1 to yield a resinous solid reaction product.

Each of the polymethylene polyphenol-phenol-aldehyde reaction products of Examples 10–14 give excellent tackiness to rubber compositions comprised of a vulcanizable synthetic rubbery polymer as previously defined.

It will be understood that it is intended to cover all changes and modifications in the preferred embodiments of the invention, herein chosen for the purpose of illustration, which do not constitute departures from spirit and scope of the invention.

We claim:

1. A tackifier which comprises the reaction product of (1) a polymethylene polyphenol prepared by heat reacting in the presence of a Friedel-Crafts catalyst (a) a phenol selected from the group consisting of phenol, alkyl substituted phenols, alkoxy substituted phenols and halogen substituted phenols and (b) a mixture of chlorinated long-chain hydrocarbons having from about 12 to 30 carbon atoms per molecule and containing from about 15% to about 45% of chlorine by weight of the chlorinated hydrocarbons, (a) and (b) being present in such amounts that the ratio of chlorine atoms to moles of phenol is from about 0.1:1 to about 2:1, (2) a phenol which is non-reactive to aldehyde at its para position, and (3) an aldehyde selected from the group consisting of formaldehyde, acetaldehyde, butyraldehyde, isobutyraldehyde and furfuraldehyde, the proportions used in forming the reaction product of (1) (2) and (3) being such that the ratio of the number of moles of polymethylene polyphenol (1) to the number of moles combined of polymethylene polyphenol (1) and phenol (2) is from about 0.01:1 to about 0.5:1 and the ratio of the number of moles of aldehyde (3) to the number of moles combined of polymethylene polyphenol (1) and phenol (2) is from about 0.5:1 to about 1.5:1, the reaction product of (1) (2) and (3) being formed at a temperature within the range from about 80° C. to 125° C. and in the presence of a catalytically effective amount of acid catalyst.

2. A tackifier in accordance with claim 1 in which the phenol (2) is substituted at its para position with a hydrocarbon radical having from one to eighteen carbon atoms.

3. A tackifier in accordance with claim 1 in which the phenol (2) is substituted at one of its meta positions with a hydrocarbon radical having at least four carbon atoms in a structure other than straight chain.

4. A tackifier in accordance with claim 1 in which the phenol (2) is substituted at both of its meta positions with hydrocarbon radicals each having at least three carbon atoms.

5. A tackifier in accordance with claim 1 in which the aldehyde (3) is formaldehyde.

6. A tackifier in accordance with claim 1 in which the ratio of the number of moles of aldehyde (3) to the number of moles combined of polymethylene polyphenol (1) and phenol (2) is from about 0.75:1 to about 1:1.

7. A tackifier in accordance with claim 1 in which the acid catalyst is present in an amount within the range of from about 0.25% to 3% based on the combined weight of the polymethylene polyphenol (1) and phenol (2).

8. A tackifier in accordance with claim 1 in which the reaction product of (1) (2) and (3) is a resinous solid which melts at a temperature above 55° C.

9. A method of forming a composition of matter for use as a tackifier in vulcanizable synthetic rubbery polymers which comprises the steps of forming a reaction mixture containing (1) a polymethylene polyphenol comprising the product of heat reacting in the presence of a Friedel-Crafts catalyst (a) a phenol selected from the group consisting of phenol, alkyl substituted phenols, alkoxy substituted phenols, and halogen substituted phenols and (b) a mixture of chlorinated long-chain hydrocarbons having from about 12 to 30 carbon atoms per molecule and containing from about 15% to about 45% of chlorine by weight of the chlorinated hydrocarbons, (a) and (b) being present in such amounts that the ratio of chlorine atoms to moles of phenol is from about 0.1:1 to about 2:1, (2) a phenol which is non-reactive to aldehyde to its para position and (3) an aldehyde selected from the group consisting of formaldehyde, acetaldehyde, butyraldehyde, isobutyraldehyde and furfuraldehyde, the proportions of (1) (2) and (3) in the reaction mixture being such that the ratio of the number of moles of polymethylene polyphenol (1) to the number of moles combined of polymethylene polyphenol (1) and phenol (2) is from about 0.01:1 to about 0.5:1 and the ratio of the number of moles of formaldehyde (3) to the number of moles combined of polymethylene polyphenol (1) and phenol (2) is from about 0.5:1 to about 1.5:1, adding a catalytically effective amount of acid catalyst to the reaction mixture, and heating the reaction mixture to a temperature within the range from about 80° C. to about 125° C. to cause condensation reaction to take place therein and thereby form a condensed reaction product.

10. The method in accordance with claim 9 in which reaction between polymethylene polyphenol (1), phenol (2) and aldehyde (3) is carried out for from about 1 to about 4 hours.

11. The method in accordance with claim 9 in which the acid catalyst is added in an amount within the range of from about 0.25% to 3% based on the combined weight of polymethylene polyphenol (1) and phenol (2) in the reaction mixture.

12. The method in accordance with claim 9 which includes the added step of neutralizing said condensed reaction product with a base.

13. The method in accordance with claim 9 which includes the added step of dehydrating said condensed reaction product.

14. A vulcanizable rubber composition which comprises a vulcanizable synthetic rubbery polymer and the reaction product of (1) a polymethylene polyphenol prepared by heat reacting in the presence of a Friedel-Crafts catalyst (a) a phenol selected from the group consisting of phenol, alkyl substituted phenols, alkoxy substituted phenols and halogen substituted phenols and (b) a mixture of chlorinated long-chain hydrocarbons having from about 12 to 30 carbon atoms per molecule and containing from about 15% to about 45% of chlorine by weight of the chlorinated hydrocarbons, (a) and (b) being present in such amounts that the ratio of chlorine atoms to moles of phenol is from about 0.1:1 to about 2:1, (2) a phenol which is non-reactive to aldehyde at its para position, and (3) an aldehyde selected from the group consisting of formaldehyde, acetaldehyde, butyraldehyde, isobutyraldehyde and furfuraldehyde, the proportions used in forming the reaction product of (1) (2) and (3) being such that the ratio of the number of moles of polymethylene polyphenol (1) to the number of moles combined of polymethylene polyphenol (1) and phenol (2) is from about 0.01:1 to about 0.5:1 and the ratio of the number of moles of aldehyde (3) to the number of moles combined of polymethylene polyphenol (1) and phenol (2) is from about 0.5:1 to about 1.5:1, the reaction product of (1) (2) and (3) being formed at a temperature within the range from about 80° C. to 125° C. and in the presence of a catalytically effective amount of acid catalyst.

15. A vulcanizable composition in accordance with claim 14 in which the vulcanizable synthetic rubbery polymer is a vulcanizable ethylene-propylene terpolymer.

16. A vulcanizable composition in accordance with claim 14 in which the vulcanizable synthetic rubbery polymer is vulcanizable cis-polybutadiene rubber.

17. A vulcanizable composition in accordance with claim 14 in which the vulcanizable synthetic rubbery polymer is vulcanizable butyl rubber.

18. A vulcanizable rubber composition in accordance with claim 14 in which the acid catalyst is present in an amount within the range of from about 0.25% to 3% based on the combined weight of polymethylene polyphenol (1) and phenol (2).

19. A vulcanizable composition in accordance with claim 14 in which the amount of the reaction product of (1) (2) and (3) is within the range from about 2% to about 60% based on the weight of the vulcanizable synthetic rubbery polymer.

20. A vulcanized rubbery composition obtained by vulcanizing with the aid of heat and a vulcanizing agent the composition of matter set forth in claim 14.

References Cited by the Examiner

UNITED STATES PATENTS

| | | | |
|---|---|---|---|
| 2,485,097 | 10/1949 | Howland et al. | 260—53 |
| 2,613,230 | 10/1952 | Niederl | 260—53 |
| 2,732,368 | 1/1956 | Shepard | 260—53 |
| 2,800,512 | 7/1957 | Hathaway | 260—623 |

MURRAY TILLMAN, *Primary Examiner.*

JOHN C. BLEUTGE, *Assistant Examiner.*